United States Patent [19]
Guichard

[11] Patent Number: 5,217,282
[45] Date of Patent: Jun. 8, 1993

[54] DEVICE FOR CONTROLLED BRAKING OF A WHEEL TRAIN WITH TEMPERATURE COMPARISON

[75] Inventor: Jean Guichard, La Garenne Colombes, France

[73] Assignee: Messier-Bugatti, Velizy-Villacoublay, France

[21] Appl. No.: 831,676

[22] Filed: Feb. 5, 1992

[30] Foreign Application Priority Data

Feb. 6, 1991 [FR] France .................. 91 01317

[51] Int. Cl.$^5$ .............................. B60T 17/10
[52] U.S. Cl. ...................... 303/9.73; 303/20; 188/382
[58] Field of Search ............. 303/7, 20, 9.62, 9.73, 303/15; 244/110 A, 110 H, 111; 188/181 T, 264 R, 382

[56] References Cited

U.S. PATENT DOCUMENTS

| | | | |
|---|---|---|---|
| 4,591,213 | 5/1986 | Rapoport | 244/111 X |
| 4,768,840 | 9/1988 | Sullivan et al. | 188/181 T |
| 4,790,606 | 12/1988 | Reinecke | 303/20 X |
| 4,804,234 | 2/1989 | Gee et al. | 303/7 |
| 4,804,237 | 2/1989 | Gee et al. | 303/7 |
| 4,923,056 | 5/1990 | Nedelk | 244/111 X |
| 4,971,179 | 11/1990 | Gebhardt et al. | 303/20 X |
| 4,986,610 | 1/1991 | Beck et al. | 244/111 X |

FOREIGN PATENT DOCUMENTS

| | | |
|---|---|---|
| 0346066 | 12/1989 | European Pat. Off. . |
| 2246775 | 5/1975 | France . |
| 2171525 | 8/1986 | United Kingdom . |

*Primary Examiner*—Robert J. Oberleitner
*Assistant Examiner*—Alfred Muratori
*Attorney, Agent, or Firm*—Sixbey, Friedman, Leedom & Ferguson

[57] ABSTRACT

A device for controlling the braking of a wheel train is disclosed and includes an actuating mechanism for alternating actuating symmetrically disposed groups of wheel brakes, temperature sensors disposed or at least one wheel brake in each of the groups of wheel brakes with the control mechanism actuating the coolest group of wheel brakes several times when the temperature difference between the groups of wheel brakes reaches a threshold temperature difference and for actuating the groups of wheel brakes cyclically so long as the threshold temperature difference is not reached.

3 Claims, 1 Drawing Sheet

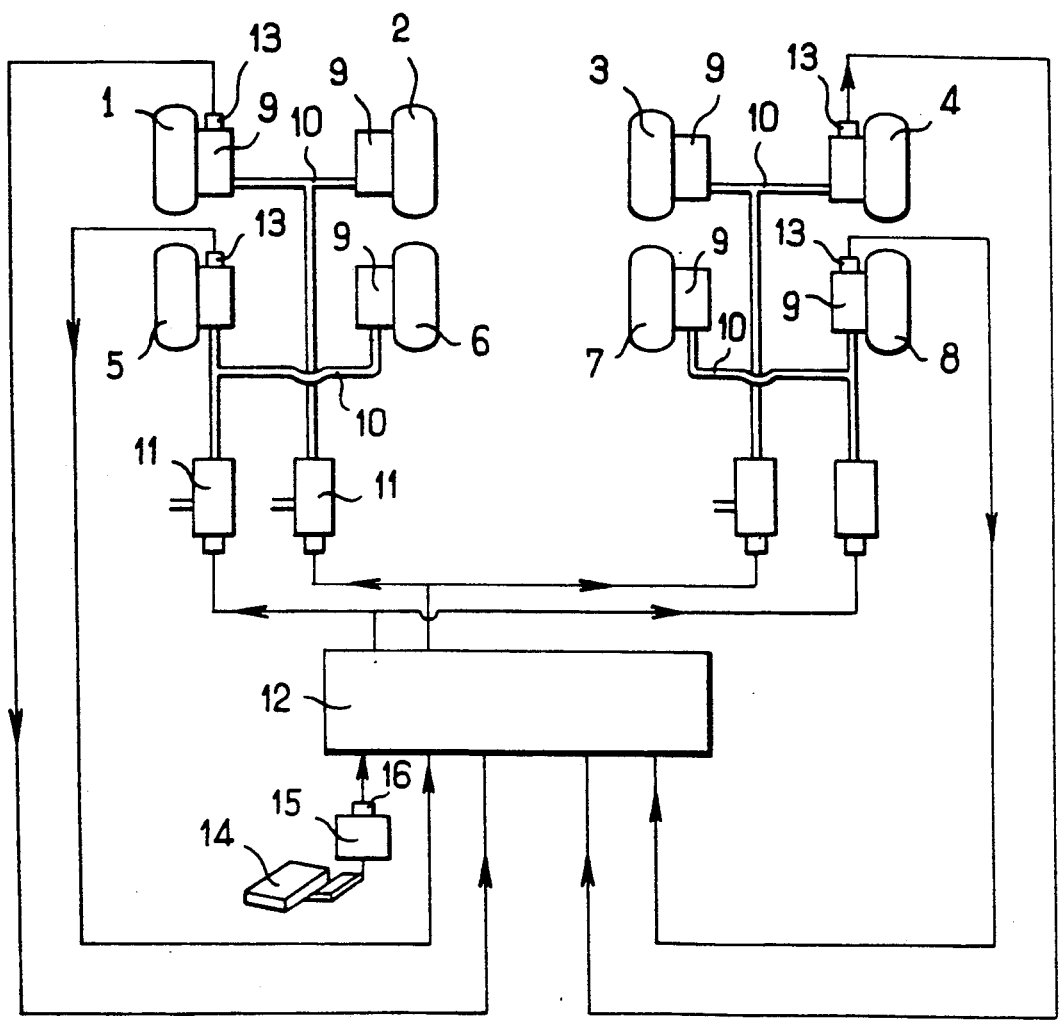

DEVICE FOR CONTROLLED BRAKING OF A WHEEL TRAIN WITH TEMPERATURE COMPARISON

The present invention relates to a device for controlled braking of a wheel train, in particular a wheel train of an airplane.

BACKGROUND OF THE INVENTION

When an airplane is running on the ground, other than during takeoff and landing, it is known that it is sometimes desirable, e.g. for passenger comfort or to reduce wear of the carbon brakes, to actuate only a fraction of the wheel brakes at any one time, with the braking that results from such partial actuation of the brakes being smoother than when all of the brakes are actuated together. Under such circumstances, in order to avoid some of the brakes heating up excessively relative to the others, proposals have been made to actuate different groups of brakes in alternation.

However, the successive occasions on which an airplane is braked do not always involve the same braking intensity, and as a result some groups of brakes may reach temperatures significantly different from other groups of brakes, thus reducing the overall effectiveness of braking in the event that emergency braking should require all of the wheel brakes to be actuated. In addition, with different brakes heated to different extents there is a danger that the pilot will think that the brakes or their control systems are not operating properly and that maintenance is required.

An object of the present invention is to propose a braking device that ensures controlled braking distributed over the various wheel brakes.

SUMMARY OF THE INVENTION

To achieve this object, the present invention provides a device for controlled braking of a wheel train, the device including means for actuating symmetrically-disposed groups of wheel brakes in alternation, means for performing immediate temperature measurement of each group of wheel brakes, and means for selecting a group of wheel brakes to be actuated as a function of the temperature measurement performed.

Thus, the alternation of braking over different groups of wheel brakes does not take place systematically, nor does it take place completely randomly, but instead it takes place in a manner that is carefully controlled to maintain all of the wheel brakes at a temperature that is as uniform as possible.

In an advantageous embodiment of the invention, the braking device includes means for measuring a temperature difference between the groups of wheel brakes and means for actuating the coolest group of wheel brakes when the difference reaches a threshold temperature difference, and for actuating the groups of wheel brakes cyclically while the threshold temperature difference is not reached.

In an embodiment in which the device includes means for performing an immediate temperature measurement, said means comprise temperature detectors disposed on at least one wheel brake in each group of wheel brakes. The information picked up is thus immediately usable.

In another embodiment of the invention in which the device includes means performing anticipated temperature measurement, said means comprise means for detecting the torque provided by each group of wheel brakes and means for calculating the energy dissipated in each group of wheel brakes as a function of the torque supplied. It is thus possible to predict the temperature increase that will result from energy being dissipated within a brake group, and thus to control the way braking alternates in such a manner as to limit the effective temperature rise within each group of brakes.

BRIEF DESCRIPTION OF THE DRAWING

An embodiment of the invention is described by way of example with reference to the accompanying drawing, in which the sole accompanying FIGURE which is a diagrammatic view of a wheel train fitted with a braking device of the invention.

DETAILED DESCRIPTION

With reference to the FIGURE, the wheel train comprises in conventional manner a series of eight wheels given numerical references 1 to 8, each fitted with a wheel brake 9 that is actuated by hydraulic fluid fed to the wheel brake by a duct 10 connected to a servo-valve 11 under the control of a braking control unit 12. To clarify the drawing, the servo-valve feed circuit is not shown. The wheels in the wheel train and the corresponding wheel brakes are subdivided into symmetrically-disposed groups of wheel brakes. In the embodiment shown, wheels 1 and 2 are connected to a common servo-valve, and wheels 3 and 4 are likewise connected to a common servo-valve, with the servo-valves for the wheels 1 to 4 being designed to be actuated simultaneously as are the servo-valves for the wheels 5 to 8. There are thus two groups of wheels which are associated with two groups of wheel brakes.

At least one of the wheels in each braking group of wheels is fitted with a temperature sensor 13 connected to the braking control unit 12 by a line for transmitting information.

In addition, braking is controlled by a pedal 14 actuating a pressure expander 15 fitted with a pedal pressure detector 16 connected to the braking control unit 12.

The braking control unit 12 may, for example, be a unit which is programmed to provide cyclic alternation of braking between the two groups of wheel brakes so long as it detects that the aircraft is running on the ground but not taking off or landing, i.e. so long as the speed of the aircraft is below a given threshold, e.g. 20 meters per second, and so long as the braking pressure is below a given threshold, e.g. $40 \times 10^5$ Pa. This cyclic alternation is modified as a function of an immediate or an anticipated measurement of the temperature of each group of brakes. For example, when the braking control unit 12 is a digital unit, it may be programmed to perform calculations as a function of various items of data input to the control unit. For example, anticipated temperature measurement is performed by using information given by the pedal pressure detector 16 and associating it with the group of brakes that is selected for actuation on each braking occasion. This pressure is representative of the torque provided by the brakes, and in particular, the higher the pressure of the pressure expander 15, the greater the torque delivered by the wheel brakes, giving rise to proportional heating of the wheel brakes. Under such circumstances, the braking control unit 12 preferably measures the time during which the pedal 14 is actuated so as to make it possible to calculate accurately the total energy dissipated in each wheel brake and to deduce therefrom by calculation the rise in temperature that will occur on each group of wheels. When the expected temperature difference between the groups of wheel brakes reaches a given threshold, cyclic control of the wheel brakes is modified so as to use the group of wheel brakes having the lower anticipated temperature several times in succession, with cyclic braking being reinstated when the anticipated temperature difference between the groups of brakes passes back beneath the threshold, or when it reduces to zero, for example. Anticipated temperature measurement may be used on its own or in association with immediate temperature measurement as provided by temperature sensors 13. When anticipated temperature measurement is used on its own, it would naturally be possible to omit the temperature sensors 13.

When the braking control unit 12 is not powerful enough to perform anticipated temperature calculations or when it is not adapted to performing such calculations, e.g. when the braking control unit is an analog unit, then only immediate temperature measurement as given by the temperature sensors 13 is used, with the temperature measurement performed in this way being used as before to modify alternating actuation of the groups of wheel brakes, e.g. when the temperature difference between the groups of wheel brakes reaches a predetermined threshold.

Naturally, the invention is not limited to the embodiment described and variant embodiments may be provided without going beyond the scope of the invention. In particular, provision may be made to take the average of various temperatures measured immediately or in anticipation at each wheel brake.

Instead of measuring pedal pressure, the torque provided by a wheel brake may be measured directly by means of strain gauges disposed on the wheel axles. This avoids the need to take account of characteristics specific to each brake when calculating the total energy dissipated.

It may be observed that immediate temperature measurement of the brakes does not require such a temperature measurement to be performed on the disks themselves. On the contrary, the measurement may be performed on any member that is thermally connected to the brake disks, e.g. the torsion tube that carries the disks. The temperature difference threshold beyond which alternating control of the brake groups is modified must therefore take account of the delay in transmitting a temperature rise from the disks where the energy is initially dissipated and the point where temperature measurement is performed.

I claim:

1. A device for controlled braking of a wheel train, the device including means for actuating symmetrically-disposed groups of wheel brakes in alternation, temperature sensors disposed on at least pne wheel brake in each group of wheel brakes, means for measuring a temperature difference between the groups of wheel brakes, and means for actuating several times in succession the coolest group of wheel brakes when the temperature difference reaches a threshold temperature difference and for actuating the groups of wheel brakes cyclically so long as the threshold temperature difference is not reached.

2. A device for controlled braking of a wheel train, the device including means for actuating symmetrically-disposed groups of wheel brakes in alternation, means for performing anticipated temperature measurement of each group of wheel brakes, means for measuring a temperature difference between the groups of wheel brakes, and means for actuating several times in succession the coolest group of wheel brakes when the temperature difference reaches a threshold temperature difference, and for actuating the groups of wheel brakes cyclically so long as the threshold temperature difference is not reached.

3. A device for controlled braking according to claim 2, wherein the means for performing anticipated temperature measurements comprise means for detecting the torque provided by each group of wheel brakes and means for calculating the energy dissipated in each group of wheel brakes as a function of the torque provided.

* * * * *